United States Patent [19]
Nakayama et al.

[11] Patent Number: 5,202,546
[45] Date of Patent: Apr. 13, 1993

[54] ROOT PASS BEAD WELDING METHOD

[75] Inventors: Shigeru Nakayama; Hisao Hasegawa; Masaki Tanaka; Katsumi Miyagawa, all of Kobe, Japan

[73] Assignee: Kawasaki Kogyo Kabushiki Kaisha, Kobe, Japan

[21] Appl. No.: 814,429

[22] Filed: Dec. 30, 1991

[30] Foreign Application Priority Data

Dec. 28, 1990 [JP]  Japan ................................. 2-418825

[51] Int. Cl.⁵ .............................................. B23K 9/00
[52] U.S. Cl. ................................................. 219/137 R
[58] Field of Search ................................... 219/137 R

[56]  References Cited
U.S. PATENT DOCUMENTS 2,623,148  12/1952  Ronay ............................... 219/137 R

FOREIGN PATENT DOCUMENTS 59-92166   5/1984   Japan ............................. 219/137 R
548992    11/1942   United Kingdom .
1505850    3/1978   United Kingdom .

Primary Examiner—Clifford C. Shaw
Attorney, Agent, or Firm—Wenderoth, Lind & Ponack

[57]  ABSTRACT

A root pass bead welding method for joining two metal base members includes forming a dike bead by welding on a rear surface of one metal base member, and placing the dike bead against or in the vicinity of a distal end of a rear surface of another metal base member to define a groove open at the front surface of the same. Then welding is performed from the front surface of the other metal base member at the groove to form a root pass bead extending between the dike bead and the rear surface of the other metal base member.

4 Claims, 4 Drawing Sheets

ROOT PASS BEAD WELDING METHOD

BACKGROUND OF THE INVENTION

The present invention relates to a root pass bead welding method.

Conventionally, one method of adjoining two members and welding them from one side using a dike bead member involves, as shown in FIG. 7, the steps of temporarily welding a dike bead member 30 to a first base member 10, placing a second base member 20 in contact with the dike bead member 30 and forming a cavity 40 between the two base members, and welding the base members from the side defining the cavity. Such a method is disclosed, for example, in Japanese Patent Laid-Open Application No. 70466-1984 and Japanese Patent Laid-Open Application No. 92167-1984, respectively. However, with this conventional welding method a large stress concentration occurs at the welded portion when loads act repeatedly, and cracking a or b occurs at the welded portion, starting from the crack origin A or B. Moreover, it is also difficult to achieve a reliable connection because of residual slits caused by the presence of the dike bead member 30. And there is a certain amount of trouble involved because it is necessary to achieve a certain degree of accuracy in the positioning of the dike bead member 30 on the first base member 10.

On the other hand, penetration beam welding methods that do not use any dike bead member whatsoever can achieve an excellent connection and exhibit excellent fatigue stress and other characteristics since there are no cutouts on the side of the root surface. However, the formation of a favorable root pass bead requires a high level of processing accuracy, and strict management of the welding conditions and assembly accuracy.

SUMMARY OF THE INVENTION

An object of the present invention is to provide a root pass bead welding method that does not require a high level of accuracy as does the conventional root pass bead welding method, but that like the conventional root pass bead welding method, enables the formation of a favorable root pass bead without any residual slits.

When two base metal members are to be adjoined and welded according to the present invention, a dike bead portion is formed on the rear surface of one of the metal base members by a bead-on-plate welding technique in the case of arc welding, and the distal end of the rear surface of the other base metal member is adjoined to the dike bead portion or is placed in the vicinity thereof in a manner in which a groove is defined from the front to the rear surface of the other metal base member. After this, welding is performed at the groove from the front surface of the base metal member so that a root pass bead is formed between the dike bead portion and the rear surface of the other metal base member.

With the root pass bead welding method of the present invention, a favorable root pass bead is formed through the groove between the dike bead portion and the rear surface of the other metal base member. Because this dike bead portion is in effect monolithic with one of the base metal members, no slits will extend from one of the metal base members to the dike bead portion, the root pass bead, and the other metal base member. In addition, when welding is performed, the dike bead portion functions as a dike to prevent a burning through of the root pass bead and so it becomes extremely simple to form the root pass bead.

DETAILED DESCRIPTION OF THE PREFERRED EMBODIMENTS

Figure 1:
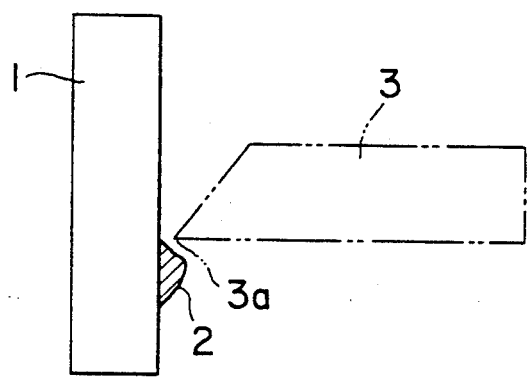
FIG. 1 is a side view of the status of two metal base members prior to welding, for use in illustrating a first embodiment of the root pass bead welding method of the present invention.

In the root pass bead welding method of the present invention, as shown in FIG. 1, a dike bead portion 2 is formed beforehand on the rear surface of one of the metal base members 1 to be welded, by forming a bead on the member 1 using arc welding. the actual welding method used for this can be MIG welding, $CO_2$ gas welding, covered arc welding or some other type of welding. In addition, the welding can be desirably performed by orienting the metal base member 1 vertically and by welding downwards, but the present invention is not necessarily limited to this. The other metal base member 3 has a bevel at the end thereof.

Figure 2:
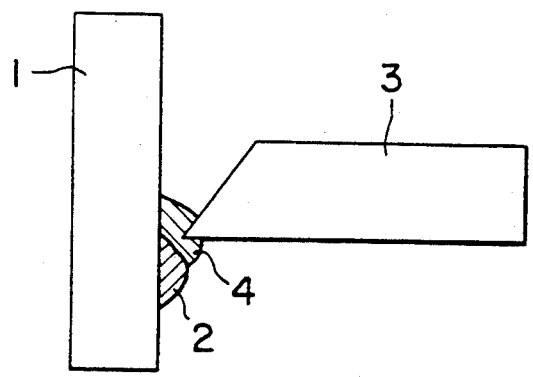
FIG. 2 is a similar view of the status of the metal base members after welding, for use in illustrating the first embodiment of the root pass bead welding method of the present invention.

Following this, as shown in FIG. 1, the distal end portion 3a of the rear surface of the other metal base member 3 is placed at a position located slightly upwardly of the dike bead portion 2, so that the bevel defines a groove at the front surface of metal base member 1. This status is maintained while welding is performed from the front surface of the metal base member 1 within the groove. When this is done, as shown in FIG. 2, a favorable root pass bead 4 is formed between the dike bead member 2 and the rear surface of the other metal base member 3 at the bottom of the groove.

According to the root pass bead welding method described above, when the root pass bead 4 is formed, the dike bead portion 2 functions as a dike that prevents the burning through of the root pass bead 4. Because of this, there can be some change in the root gap so that a high level of precision is not required for part processing, assembly and the management of the welding conditions. In addition, there are no slits extending from the metal base member 1 to the dike bead member 2, the root pass bead 4, and the other metal base member 3.

Figure 3:
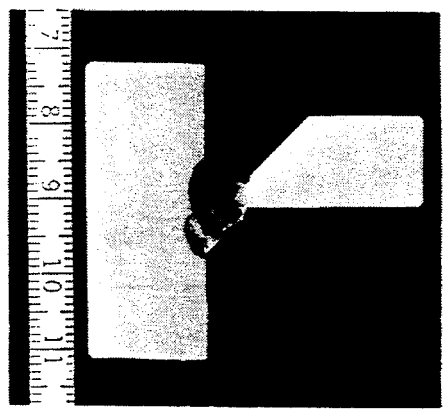
FIG. 3 is a detailed view of the metal of a welded connection obtained through the application of the root pas bead welding method of the present invention.
Figure 4:
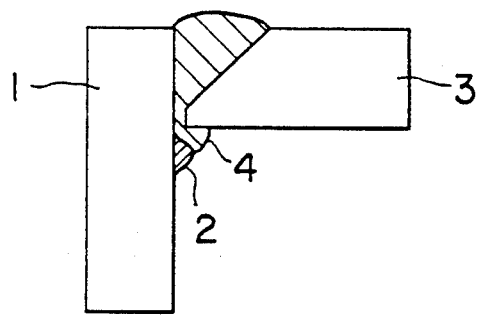
FIG. 4 is a side view of another welded connection obtained through the application of the root pass bead welding method of the present invention.
Figure 5:
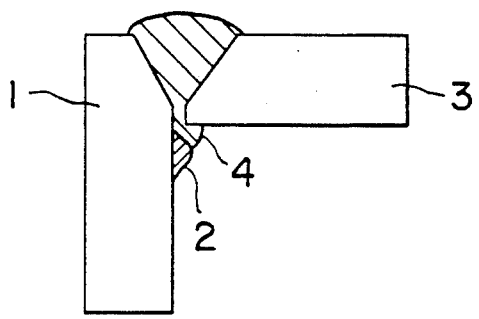
FIG. 5 is a side view of yet another welded connection obtained through the application of the root pass bead welding method of the present invention.
Figure 7:
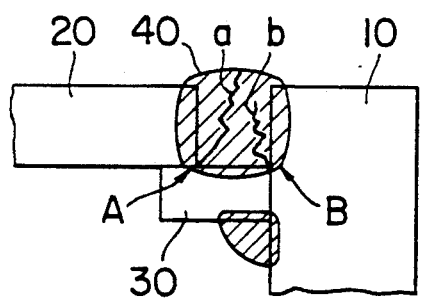
FIG. 7 is a side view of a conventional welded connection in which a dike bead portion is used to adjoin two members and is welded from one side.

FIG. 3 shows the condition of metal of a welded connection obtained through the application of an embodiment of the root pass bead welding method according to the present invention. More specifically, the dike bead member 2 was formed by the $CO_2$ gas arc welding method using a welding voltage of 20 V, a welding current of 150 A, and a welding speed of 360 mm/min. The other metal base member 3 was a plate with a thickness of 12 mm and a groove angle of 45°. The conditions for the root pass bead welding were such that $CO_2$ gas arc welding was performed with a welding voltage of 26 V, a welding current of 250 A, and a welding speed of 350 mm/min.

According to the method of the present invention as described above, root pass bead welding is performed while using one metal base member as a dike for the root pass bead. Accordingly, it is possible to perform favorable root pass bead welding without any internal slits and for there to be a larger than conventional gap where the root pass bead is formed. Because of this, the conventionally high degree of precision is not required for parts processing and assembly, there is a larger range in the conditions under which the welding can be carried out, and there is an improvement in the efficiency of welding.

Moreover, when a dike member is used with structures of complex shapes, it is necessary for the shape of the dike member and its positioning along a member having a complex shape to be accurate; however, with the root pass bead welding method of the present invention, bead-on-plate welding is preferably used and so the welding efficiency in this case remains high.

Table 1 shows the conditions for performing welding according to the method of the present invention for respective metal base member thicknesses (t) of 9, 14 and 19 millimeters (mm). However, the layering conditions differ according to these thicknesses and the implementation of the method of the present invention is possible using the same welding conditions (dike bead welding: 20 V, 150 A, 360 mm/min., root pass bead welding: 30 V, 300 A, 360 mm/min.). The root pass bead welding conditions are as described earlier in FIG. 3 with respect to each of the metal base member thicknesses. The application of this root pass bead welding method also allows stable welding to be carried out over a wide range of applications.

We claim:

1. A root pass bead welding method of or joining two metal base members, said method comprising the steps of:
   welding one of said metal base members to form a dike bead on a rear surface of said one of said metal base members;
   placing the distal end of the other of said metal base members on said dike bead or in the vicinity thereof so as to define a groove at said distal end open at a front surface of said other of said metal base members and extending towards a rear surface thereof; and
   forming a root pass bead extending from said dike bead to the rear surface of said other of said metal base members by welding both of said base members at said groove from the front surface of said other of said base members.

2. The root pass bead welding method of claim 1, wherein the forming of said dike bead is effected by a bead-on-plate technique carried out by arc welding.

3. A root pass bead welding method comprising:
   providing a first metal base member, and a second metal base member having a bevel at an end thereof extending in a direction from a front surface of the second metal base member towards a rear surface thereof;
   welding said first metal base member to form a dike bead on a rear surface of said first metal base member;
   placing a distal end portion of said rear surface of said second metal base member at the beveled end thereof on or in the vicinity of said dike bead such that the beveled end defines a groove open at the front surface of the second metal base member and extending towards said dike bead disposed on or in the vicinity of the distal end portion of said rear surface of said second metal base member;
   forming a root pass bead extending from said dike bead to the rear surface of said second metal base member by welding both of said base members at said groove from the front surface of said second metal base member.

4. The root pass bead welding method of claim 3, wherein the forming of said dike bead is effected by a bead-on-plate technique carried out by arc welding.

TABLE 1

| Metal base member thickness | Dike bead welding | | | Root pass bead welding | | | Layering welding | | | |
|---|---|---|---|---|---|---|---|---|---|---|
| | Voltage V | Current A | Speed mm/min. | Voltage V | Current A | Speed mm/min. | Voltage V | Current A | Speed mm/min. | Number of passes |
| (a) 9 mm | 20 | 150 | 360 | 30 | 300 | 360 | 31 | 310 | 230 | 1 |
| (b) 14 mm | | | | | | | 31 | 310 | 210~230 | 3 |
| (c) 19 mm | | | | | | | 31 | 310 | 180~230 | 4 |

Figure 6A:
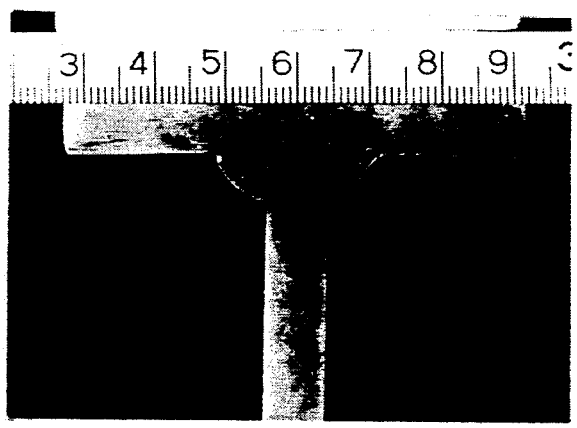
FIGS. 6(a)–6(c) are detailed views of the metal of welded connections with different metal base member thicknesses obtained through the application of the root pass bead welding method of the present invention.
Figure 6B:
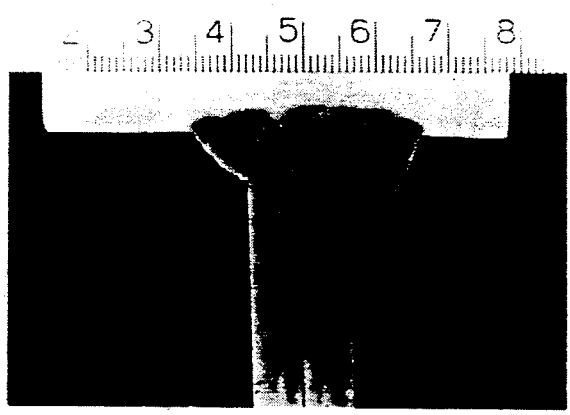
Figure 6C:
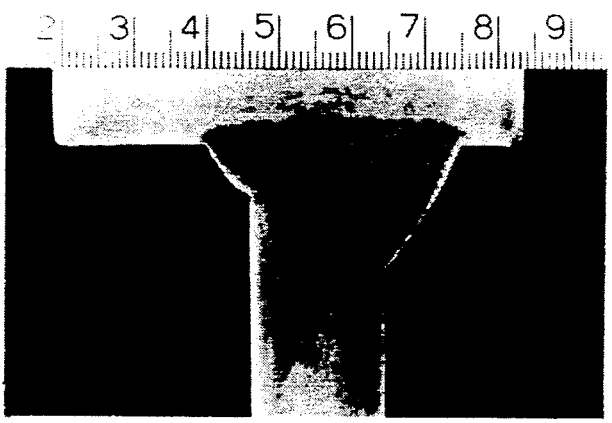

FIG. 6 shows the metal of welded connections with different metal base member thicknesses ((a): 9 mm; (b): 14 mm; (c): 19 mm) obtained by carrying out the root pass bead welding method of the present invention according to the welding conditions shown in Table 1.

UNITED STATES PATENT AND TRADEMARK OFFICE
CERTIFICATE OF CORRECTION

PATENT NO. : 5,202,546
DATED : April 13, 1993
INVENTOR(S) : Shigeru NAKAYAMA ET AL.

It is certified that error appears in the above-indentified patent and that said Letters Patent is hereby corrected as shown below:

On the title page, item [73], change "Kogyo" to --Jukogyo--.

Signed and Sealed this

Fourth Day of January, 1994

Attest:

BRUCE LEHMAN

Attesting Officer

Commissioner of Patents and Trademarks